(12) United States Patent
Spapis et al.

(10) Patent No.: US 11,083,048 B2
(45) Date of Patent: Aug. 3, 2021

(54) DEVICES AND METHODS FOR TRANSFORMING USER PLANE SIGNALING FROM A REMOTE SIDELINK CONTROL SERVER INTO CONTROL PLANE SIGNALING

(71) Applicant: Huawei Technologies Co., Ltd., Shenzhen (CN)

(72) Inventors: Panagiotis Spapis, Munich (DE); Chan Zhou, Munich (DE); Chenghui Peng, Shanghai (CN); Serkan Ayaz, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/855,189

(22) Filed: Apr. 22, 2020

(65) Prior Publication Data

US 2020/0252998 A1 Aug. 6, 2020

Related U.S. Application Data

(63) Continuation of application No. PCT/EP2017/077229, filed on Oct. 25, 2017.

(51) Int. Cl.
*H04W 88/16* (2009.01)
*H04W 4/40* (2018.01)
(Continued)

(52) U.S. Cl.
CPC .............. *H04W 88/16* (2013.01); *H04W 4/40* (2018.02); *H04W 60/00* (2013.01); *H04W 88/085* (2013.01); *H04W 92/18* (2013.01)

(58) Field of Classification Search
CPC ....... H04W 88/16; H04W 4/40; H04W 60/00; H04W 88/085; H04W 92/18; H04W 76/12; H04W 16/14; H04W 76/14; H04W 80/00

See application file for complete search history.

(56) References Cited

U.S. PATENT DOCUMENTS

| 9,491,002 B1 | 11/2016 | Brandwine et al. |
| 9,763,179 B2 | 9/2017 | Pragada et al. |

(Continued)

FOREIGN PATENT DOCUMENTS

| CN | 1780219 A | 5/2006 |
| CN | 101622824 A | 1/2010 |

(Continued)

OTHER PUBLICATIONS

"3rd Generation Partnership Project; Technical Specification Group Services and System Aspects; Architecture enhancements for V2X services (Release 14)," 3GPP TS 23.285 V14.4.0, Sep. 2017, 35 pages.

(Continued)

*Primary Examiner* — Marisol Figueroa
(74) *Attorney, Agent, or Firm* — Slater Matsil, LLP

(57) ABSTRACT

A gateway device configured to transform user plane information/packets/signaling related to the control of sidelink communication services and/or resources of a mobile communication network from a remote sidelink control server into control plane signaling and to provide the control plane signaling to a terminal device and/or one or more further network entities of the mobile communication network.

20 Claims, 8 Drawing Sheets

(51) Int. Cl.
*H04W 60/00* (2009.01)
*H04W 88/08* (2009.01)
*H04W 92/18* (2009.01)

(56) References Cited

U.S. PATENT DOCUMENTS

| | | |
|---|---|---|
| 9,876,851 B2 | 1/2018 | Chandramouli et al. |
| 2014/0325219 A1 | 10/2014 | Hsiao |
| 2020/0329412 A1* | 10/2020 | Shiga .................... H04W 84/06 |
| 2021/0084453 A1* | 3/2021 | Wang .................... H04W 76/11 |

FOREIGN PATENT DOCUMENTS

| | | | |
|---|---|---|---|
| CN | 102056112 | A | 5/2011 |
| CN | 104159267 | A | 11/2014 |
| CN | 104243450 | A | 12/2014 |
| CN | 104272707 | A | 1/2015 |
| CN | 104754613 | A | 7/2015 |
| EP | 3139646 | A1 | 3/2017 |
| WO | 2019001702 | A1 | 1/2001 |
| WO | 0113599 | A2 | 2/2001 |
| WO | 2015200012 | A1 | 12/2015 |
| WO | 2018065049 | A1 | 4/2018 |
| WO | 2018219436 | A1 | 12/2018 |

OTHER PUBLICATIONS

EATA European Automotive and Telecom Alliance, Programme, "12th European Congress and Exhibition on Intelligent Transport Systems and Services," 12th ITS European Congress Presentation, Strasbourg, France, Jun. 19-22, 2017, 72 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36300 V14.4.0, Sep. 2017, 329 pages.
"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.15.1, Sep. 2017, 460 pages.
Chatzikokolakis, K. et al., "Toward Spectrum Sharing: Opportunities and Technical Enablers," 5G Spectrum: Enabling the Future Mobile Landscape, IEEE Communications Magazine, Jul. 2015, 8 pages.
"A Deliverable by the NGMN Alliance," NGMN 5G White Paper, Next Generation Mobile Networks, Feb. 17, 2015, 125 pages.

* cited by examiner

DEVICES AND METHODS FOR TRANSFORMING USER PLANE SIGNALING FROM A REMOTE SIDELINK CONTROL SERVER INTO CONTROL PLANE SIGNALING

CROSS-REFERENCE TO RELATED APPLICATIONS

This application is a continuation of International Application No. PCT/EP2017/077229, filed on Oct. 25, 2017, the disclosure of which is hereby incorporated by reference in its entirety.

TECHNICAL FIELD

In general, the present invention relates to the field of wireless communication. More specifically, the present invention relates to a gateway device configured to transform user plane signaling from a remote sidelink control server, in particular a V2X control server, into control plane signaling and to provide the control plane signaling to a terminal device.

BACKGROUND

In vehicle-to-everything (V2X) communications as presented in 12th ITS European congress presentation, European Automotive and Telecom Alliance, 2017 or in NGMN 5G white paper, a vehicle is able to establish sessions with all other vehicles in their geographical areas. If all the vehicles belong to the same operator, they are visible to each other and to the operator, which facilitates the communication via direct links or via the operator network efficiently. This type of communication in most of the cases manages to meet the stringent requirements of V2X use cases.

If vehicles belong to different mobile network operators, the communication between the vehicles can be performed via one of the following approaches: uplink/downlink communication links, use of D2D (device-to-device) communication, use of common spectrum pool, and coordination among the operators (single operator approaches and forced roaming schemes).

The first approach mentioned above relates to user communication via uplink and downlink channels (see the specification 3GPP TS36.300). Such communication requires transmission of packets from each operator network and the internet, which fails to meet the requirements for V2X communications.

The second approach mentioned above relates to D2D communication and it is specified in the current 3GPP standard (see the specification 3GPP TS36.331). In this case each operator provides in advance a set of predefined rules for communication regarding, for example, transmission power, spectrum pools, congestion control parameters, and each user equipment (UE) uses these rules for communication. In a congested environment, this approach however results in collisions because of the simultaneous transmission of all the UEs and increases end-to-end delays due to retransmissions. Additionally, the backoff timers used in the congestion control algorithms for handling the collision increase can further worsen the delays. At least some of the above reasons lead to delay levels which are unacceptable for V2X communication.

The third approach is based on the use of a common spectrum among the individual networks. Each network operator, before accessing a spectrum chunk, has to communicate with a coordination entity which is responsible for coordination of the individual networks. Such an approach requires a coordination time in the range of minutes and it is more suitable for traditional spectrum-sharing scenarios.

A fourth approach is based on the coordination among the network operators and splits the overall operation area into smaller areas in which only one operator coordinates the common resources and all the UEs are allocated to that operator. Even though this approach manages to meet the V2X requirement in terms of delay, splitting of the overall operation area is a complex task and needs to be regulated in a very controlled manner. Furthermore, when switching from one single-operator area to another, the UE can suffer service interruption in a certain period of time which is much higher than the V2X requirements.

Apart from the approaches mentioned above, the multi-operator problem can be solved by using a coordination public server (also referred to as cloud server) which coordinates common resources, such as spectrum, authentication/authorization functions, and applications. Exemplary implementations on the basis of such coordination public server are explained as follows.

First, communication of the parameters can be performed via an application, which requires exposure of the network protocols to the application via interfaces. Typically, these interfaces are not standardized/exposed because of the security risks they may cause (e.g., denial of service attacks, malicious users). This solution implies that a set of functionalities (i.e., the functionalities captured by the RRC protocol in LTE networks) that conventionally have been located in the access network (e.g., base stations or eNBs) will be moved to the cloud servers. However, this requires drastic changes in the standardization.

Secondly, communication of the parameters can be performed via a base station, wherein the base station will translate cloud server directions/allocations to the locally-placed radio control functions and transmit the directions/allocations through the broadcast channels as it has been implemented up to now. In such case, the cloud server will know the topology of the network. However, this is rather unlikely to happen for security reasons.

Furthermore, the above solution does not indicate how the user equipment can locate the public cloud server. Up to now this has been done using the V2X control function (see 3GPP TS23285) which is used for purposes of discovery and authorization/authentication, as can be seen in the reference architecture 100 for the PC5 and LTE-Uu based V2X communication shown in FIG. 1. This scheme is suitable for the functions in the local network and cannot be used for discovery of supporting functions outside of the local operator network. Thus, this approach relies on the application to discover the public cloud server. However, such approach is vulnerable to malicious applications.

As aforementioned, conventional approaches fail to provide for multi-network communication under the identified requirements or are based on unrealistic assumptions which require drastic changes in the standardization or exposure of the network topology to external networking entities, e.g. external servers.

In light of the above, there is a need for improved devices and methods for transforming signaling between a mobile communication network and a remote sidelink control server, allowing a secure connection to the external network without exposing topology of the mobile communication network.

SUMMARY

It is an object of the invention to improve sidelink communication within a mobile communication network, in particular to provide improved devices and methods for transforming signaling between a mobile communication network and a remote sidelink control server, allowing a secure connection to the external network without exposing topology of the mobile communication network.

The foregoing and other objects are achieved by the subject matter of the independent claims. Further implementation forms are apparent from the dependent claims, the description and the figures.

Generally, the present invention relates to a gateway device which enables discovery of an external/remote sidelink control server, such as a public cloud server, as well as secure communication with the external/remote sidelink control server without exposing the network topology.

More specifically, embodiments of the invention can coordinate different networks by supporting each individual network to connect to an external/remote sidelink control server such as a public cloud server and to receive information from it regarding the UE connectivity parameters without exposing the networks topology to the external network. The public cloud server can be part of the internet or any other network, such as the network of another operator. The embodiments of the invention can facilitate the coordination of individual networks when they access shared resources, such as spectrum, authentication/authorization functions, and applications in short timescales.

Thus, according to a first aspect the invention relates to a gateway device configured to transform user plane signaling related to the control of sidelink communication services and/or resources of a mobile communication network from a remote sidelink control server into control plane signaling and to provide the control plane signaling to a terminal device and/or one or more further network entities of the mobile communication network. The user plane signaling according to embodiments of the invention can be defined as data messages that contain information for the control of the sidelink resources instead of carrying user data traffic. The control can refer to information related to various information fields, such as configuration of radio parameters, authentication/authorization functions or keys, application information. This information is used to configure control functions in the network elements, which was performed using control plane signaling in conventional networks.

An improved gateway device is hence provided, allowing a secure connection to a remote sidelink control server without exposing the network topology to the external network.

In a further possible implementation form of the first aspect, the gateway device is further configured to transform control plane signaling related to the control of sidelink communication services and/or resources of the mobile communication network from the terminal device and/or the one or more further network entities of the mobile communication network into user plane signaling and to provide the user plane signaling to the remote sidelink communication server.

In a further possible implementation form of the first aspect, the user plane signaling is based on internet protocol (IP) packets, wherein the IP packets comprise, in particular, information for the control of sidelink communication.

In a further possible implementation form of the first aspect, the one or more further network entities of the mobile communication network comprise a local sidelink communication server of the mobile communication network and wherein the gateway device is configured to transform user plane signaling from the remote sidelink control server related to a registration request of the remote sidelink control server into control plane signaling and to provide the control plane signaling to the local sidelink control server for registering the remote sidelink control server with the local sidelink control server.

In a further possible implementation form of the first aspect, the one or more further network entities of the mobile communication network comprise a local sidelink control server of the mobile communication network and wherein the gateway device is configured to transform control plane signaling from the local sidelink control server related to a registration request of the terminal device into user plane signaling and to provide the user plane signaling to the remote sidelink control server for registering the terminal device with the remote sidelink control server.

In a further possible implementation form of the first aspect, the gateway device is configured to transform control plane signaling related to a request for sidelink resources by the terminal device of the mobile communication network into user plane signaling and to provide the user plane signaling to the remote sidelink control server.

In a further possible implementation form of the first aspect, the one or more further network entities of the mobile communication network comprises a plurality of base stations and wherein the gateway device is configured to select one of the plurality of base stations on the basis of a location of the terminal device for providing the control plane signaling to the selected base station. The plurality of base stations comprise any one of the following: a macro, micro, pico or/and femto base station.

In a further possible implementation form of the first aspect, the gateway device is configured to transform control plane signaling related to sidelink channel information provided by the terminal device into user plane signaling and to provide the user plane signaling to the remote sidelink control server and wherein the gateway device is further configured to transform user plane signaling from the remote sidelink control server related to the allocation of sidelink radio resources on the basis of the sidelink channel information into control plane signaling and to provide the control plane signaling to the terminal device.

In a further possible implementation form of the first aspect, the one or more further network entities of the mobile communication network comprise a base station and wherein the gateway device is configured to transform control plane signaling related to sidelink channel information provided by the base station into user plane signaling and to provide the user plane signaling to the remote sidelink control server and wherein the gateway device is further configured to transform user plane signaling from the remote sidelink control server related to the allocation of sidelink radio resources on the basis of the sidelink channel information into control plane signaling and to provide the control plane signaling to the base station.

According to a second aspect the invention relates to a method of operating a gateway device, wherein the method comprises transforming user plane signaling related to the control of sidelink communication services and/or resources of a mobile communication network from a remote sidelink control server into control plane signaling, and providing the control plane signaling to a terminal device and/or one or more further network entities of the mobile communication network.

Thus, an improved method is provided, allowing a secure connection to a remote sidelink control server without exposing the network topology to the external network.

According to a third aspect the invention relates to a computer program comprising a program code for performing the method of the second aspect when executed on a computer.

According to a fourth aspect the invention relates to a communication system which comprises one or more mobile communication networks, wherein each mobile communication network comprises a gateway device according to the first aspect, and a remote sidelink control server configured to communicate with the one or more gateway devices on the basis of user plane signaling.

Thus, an improved communication system is provided, allowing coordination of different mobile communication networks and enabling a connection to a remote sidelink control server without exposing the network topology to the external network.

In a further possible implementation form of the fourth aspect, each gateway device is located at the edge of the respective mobile communication network.

In a further possible implementation form of the fourth aspect, the remote sidelink control server is a public cloud server.

In a further possible implementation form of the fourth aspect, the remote sidelink control server is a local sidelink control server of one of the one or more mobile communication networks.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF ILLUSTRATIVE EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
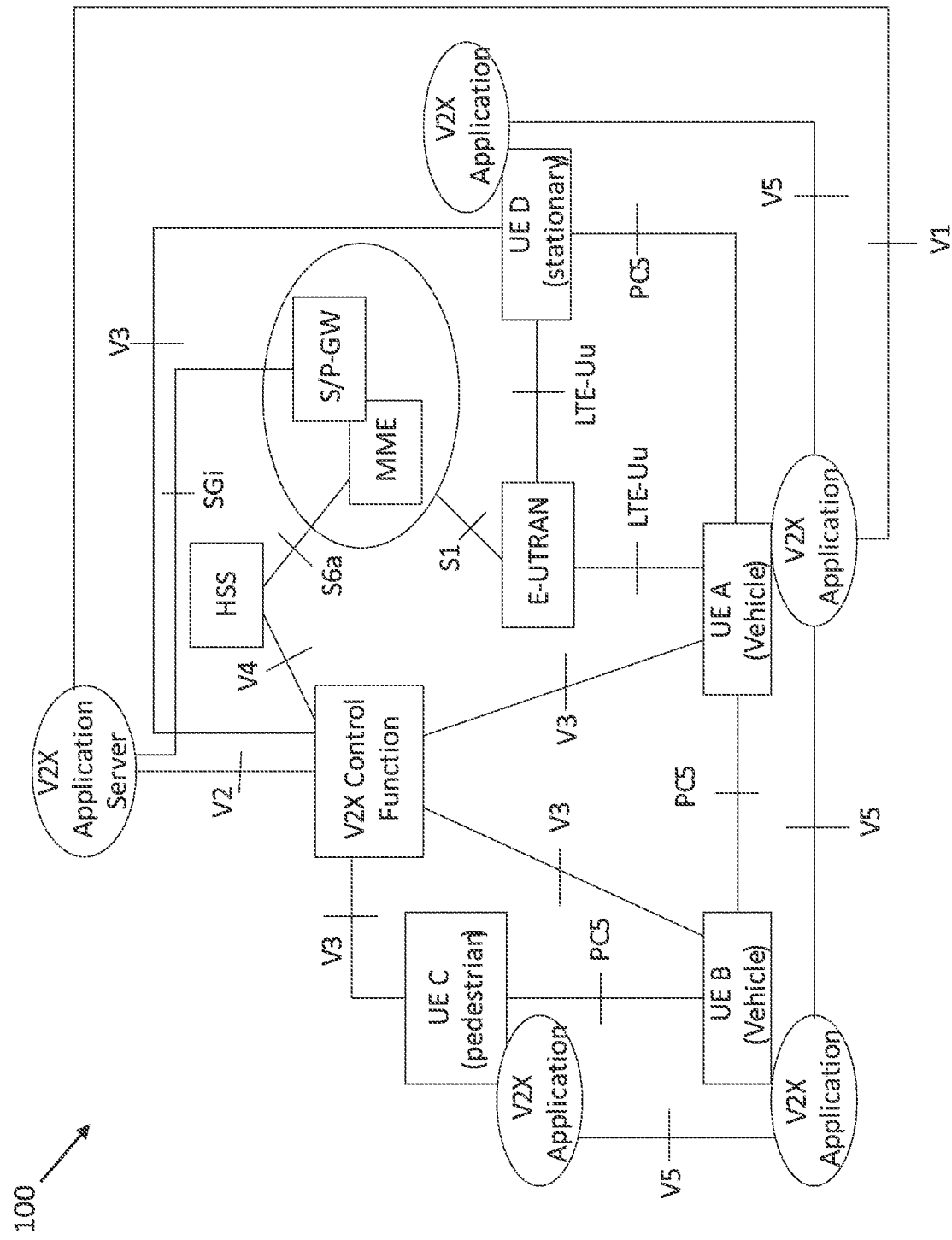
FIG. 1 shows a schematic diagram of a non-roaming reference architecture for PC5 and LTE-Uu based V2X communication.
Figure 2:
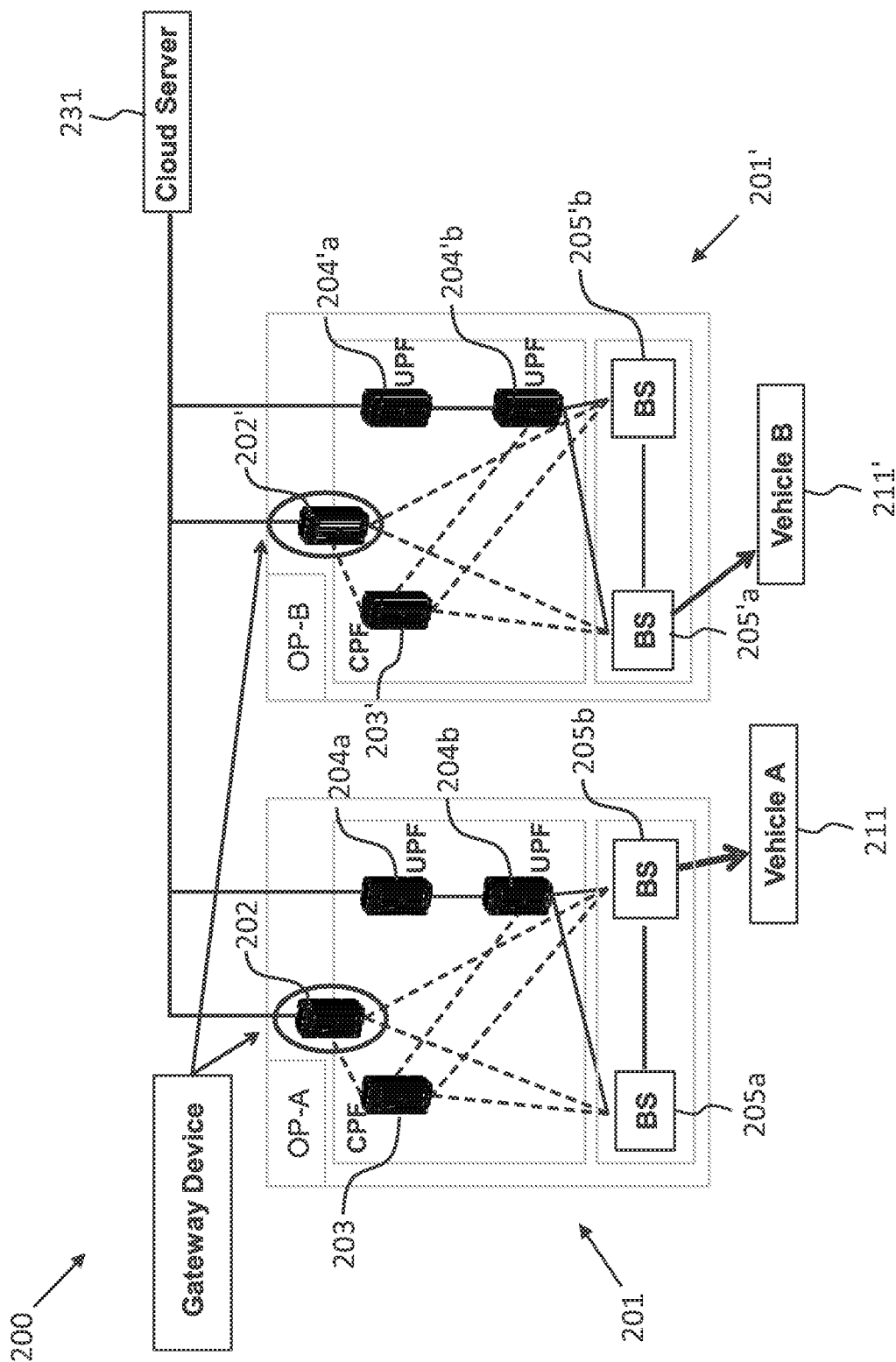
FIG. 2 shows a schematic diagram of a communication system comprising a mobile communication network, a further mobile communication network and a remote sidelink control server according to an embodiment.

Embodiments of the invention can be implemented in a communication system 200, which has a general architecture as shown in FIG. 2. In the embodiment shown in FIG. 2 the communication system 200, by way of example, comprises a mobile communication network 201 operated by a network operator OP-A and a further mobile communication network 201' operated by a network operator OP-B. Furthermore, the mobile communication network 201 comprises a gateway device 202 and the further mobile communication network 201' comprises a further gateway device 202', wherein the gateway devices 202 and the further gateway device 202' are located at the edge of the respective mobile communication networks 201, 201'.

In an exemplary embodiment, the gateway device 202 can be a standalone entity or can be collocated with any other entity in the network. Further implementation forms of the gateway device 202 will be described in more details further below.

The communication system 200 further comprises a remote sidelink control server 231, which is configured to communicate with the gateway device 202 and the further gateway device 202' on the basis of user plane signaling, wherein the user plane signaling can be based on IP packets. In an exemplary embodiment, the remote sidelink control server 231 can be a public cloud server 231 or can be a local sidelink control server of one of the one or more mobile communication networks 201, 201', as will be explained in more detail in the context of the embodiment shown in FIG. 7.

As can be taken from FIG. 2, the mobile communication network 201 comprises several network entities for the control plane functions 203 and for user plane functions 204a-b that can facilitate communication between a user equipment (UE) 211 in the mobile communication network 201 with the internet or external networks 231. By way of example, the UE 211 can be implemented as part of a vehicle A.

Exemplary control plane functions (CPF) 203 can comprise mobility servers such as a mobility management entity (MME) in LTE networks, charging functions such as policy and charging rules functions (PCRF) in LTE networks, subscriber servers such as a home subscriber server (HSS) in LTE networks and any other control plane function.

Similarly, the user plane functions (UPF) 204a-b can comprise packet gateways to the internet such as a packet data network (PDN) gateway in LTE networks, serving gateways such as a serving gateway in LTE networks, and any other type of routers and gateways.

In conventional LTE networks, for establishing a connection with the public network, e.g. internet or any type of public servers, the user equipment (UE) 211 needs to interact with the control plane functions (CPFs) 203 first so as to locate the user plane functions (UPFs) 204a-b and the respective gateways that route the traffic from and/or to the public network.

In contrast, according to embodiments of the invention the gateway device 202 can directly communicate with the control plane functions (CPFs) 203 and access network nodes (e.g., base stations or eNBs 205a,b) through control-plane interfaces to provide to them the information coming from the public cloud that has to be transferred to the respective UEs 211. This information can relate to various information fields, such as spectrum to be used, authentication/authorization functions or keys, application information. Instead of direct communication between the public cloud server 231 and the eNBs 205a,b, the gateway device 202 can translate the inputs from the public cloud to network signaling. Therefore, the gateway device 202 not only can facilitate the communication of the public cloud with the network elements but also can protect the network topology from being exposed to the external server 231.

More specifically, the gateway device 202 is configured to transform user plane signaling related to the control of sidelink communication services and/or resources of the mobile communication network 201 from the remote sidelink control server 231 into control plane signaling and to provide the control plane signaling to the terminal device 211 and/or one or more of the further network entities 205a,b, 203, 204a,b of the mobile communication network 201, wherein the user plane signaling is carried over a user plane, in particular through IP packets. Furthermore, the gateway device 202 is configured to transform control plane signaling related to the control of sidelink communication services and/or resources of the mobile communication network 201 from the terminal device 211 and/or the one or more further network entities 205a,b, 203, 204a,b of the mobile communication network 201 into user plane signaling and to provide the user plane signaling to the remote sidelink communication server, i.e. the public cloud server 231.

Additional functionalities can also be provided by the gateway device 202 for enabling the communication with the remote sidelink control server 231. These functionalities can comprise registration of the public cloud server 231 to the operator network 201, discovery of the public cloud server 231 from the user equipment 211, and communication between the public cloud server 231 and the user equipment 211. These functionalities are further described in details in the following embodiments.

When the user equipment (UE) 211 wants to initiate a V2X application, it will initially contact a local V2X server 351 (which will be explained in more detail in the context of FIG. 3) to identify the network location of the V2X application as the V2X server 351 maintains a repository with all the network applications that are in the domain of the operator network 201. In LTE networks, a V2X server 351 is a V2X control function. Hereafter the V2X server 351 is also referred to as the V2X control function.

On the other hand, in the case of registration of an external (application) server, such as the public cloud server 231, a different procedure should be considered. In particular, the public cloud server 231 residing outside of the network of the operator 201 needs to send a register message to the gateway device 202 to initiate the registration procedure. Then, after an authentication/authorization, the process for verifying the public cloud server 231 can be finalized and the registration message can be forwarded from the gateway device 202 to the V2X server 351 for including the new public cloud server 231 to the repository of the V2X server 351. The V2X server 351 can notify the success of this operation via an ACK message that can be forwarded via the gateway device 202 to the public cloud server 231.

When the user equipment (UE) 211 wants to locate a V2X application it will communicate to the V2X server 351 requesting a certain application location. If this application resides out of the network of the operator 201, then the V2X server 351 will send to the public cloud server 231 a message with a registration request for the respective user, including its public identifier (ID) and its location area. The location area may be indicated in a precise or rough manner according to the requirements of the particular application. Then the public cloud server 231 will acknowledge the proper registration of the UE 211 via the respective server, since the exact topology of the network 201 is not known to the public cloud server 231 and all the communication goes through the gateway device 202. The procedure described above is described in FIG. 3.

Figure 3:
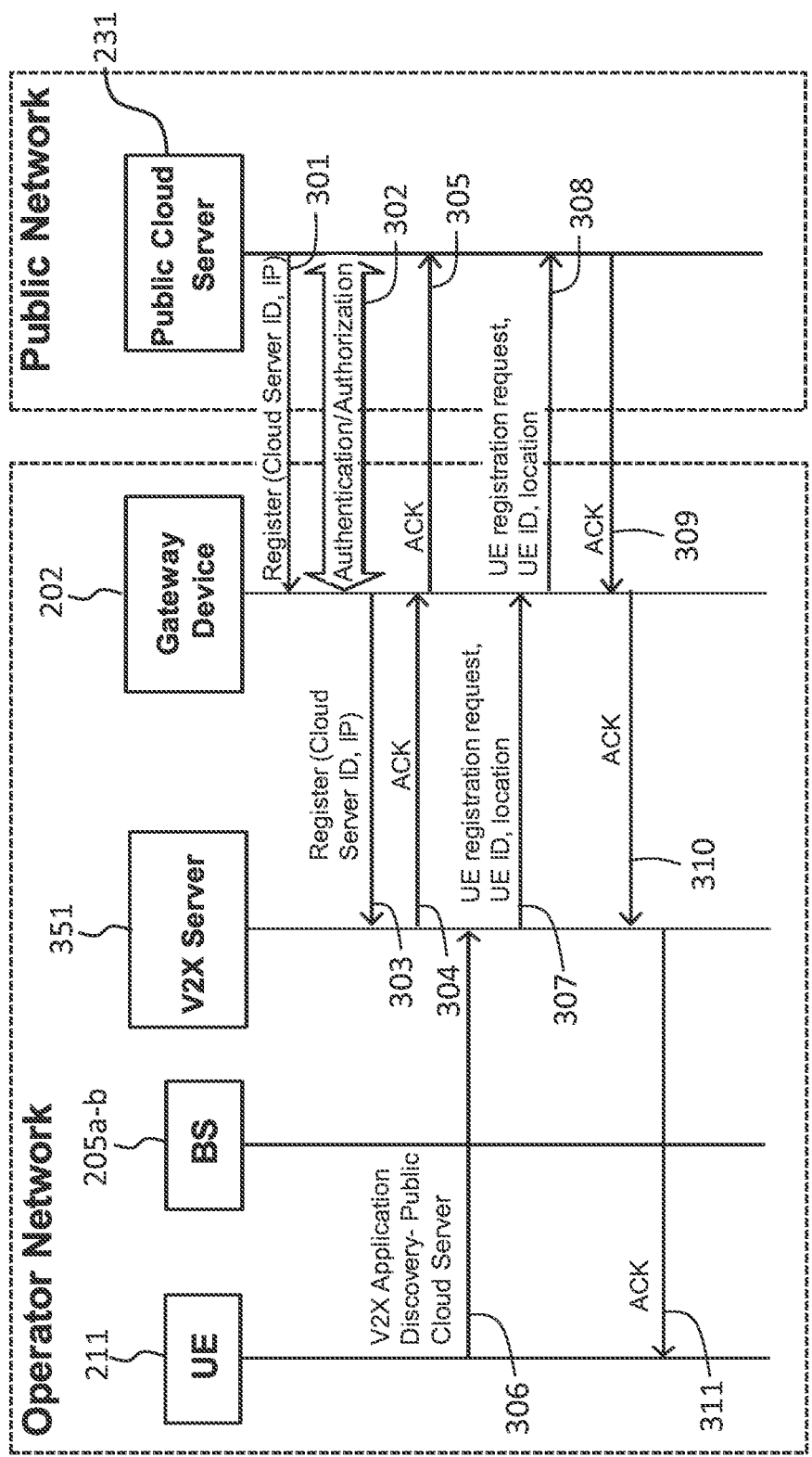
FIG. 3 shows a schematic diagram illustrating an exemplary procedure of message exchange for a registration of a remote sidelink control server according to an embodiment.

FIG. 3 shows a schematic diagram illustrating an exemplary procedure of message exchange for the registration of the public cloud server 231 to the V2X server 351. The procedure shown in FIG. 3 comprises the following steps.

The public cloud server 231 sends a register message to the gateway device 202 to initiate the registration procedure (step 301). Then, an authentication/authorization process for verifying the public cloud server 231 can take place (step 302). The registration message can be forwarded from the gateway device 202 to the V2X server 351 for including the new public cloud server 231 to the repository of the V2X server 351 (step 303). The V2X server 351 can notify the success of this operation via an acknowledgement (ACK) message (step 304). The ACK message can be forwarded via the gateway device 202 to the public cloud server 231 (step 305). When the user equipment (UE) 211 wants to locate a V2X application it can communicate to the V2X server 351 requesting a certain application location (step 306). If this application resides out of the network of the operator 201, then the V2X server 351 sends a message with a registration request from the respective user, including its public identifier (ID) and its location area to the public cloud server 231 via the gateway device 202 (step 307). The gateway device 202 forwards the message to the public cloud server 231 (step 308). The public cloud server 231 can acknowledge the proper registration of the UE 211 using an ACK message via the gateway device 202 (step 309). The gateway device forwards the ACK message to the V2X server (step 310). The V2X server forwards the ACK message to the UE (step 311). While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Other possible processes for registration include direct communication from the V2X server 351 to the external public cloud server 231. However, it is possible that such direct communication may expose the network topology to the external network and is hence not recommended.

Provision of resources from the public cloud server 231 can be implemented in two separate cases. In a first case as will be illustrated in FIGS. 4 and 5 below, the provision of resources can be available to the UE 211 when the UE 211 is out of the network coverage or does not need further assistance from the network 201, which is similar to the mode 4 PC5 communication in LTE networks. In a second case as will be illustrated in FIG. 6 below, the provision of resources can be available to the UE 211 when the UE 211 is in the network coverage and requires network assistance for the communication, which is similar to the mode 4 PC5 communication in LTE networks.

It is worth noting that in the first case, the UE 211 might still be in the network coverage, but the UE 211 does not use the network assistance for the direct communication.

Figure 4:
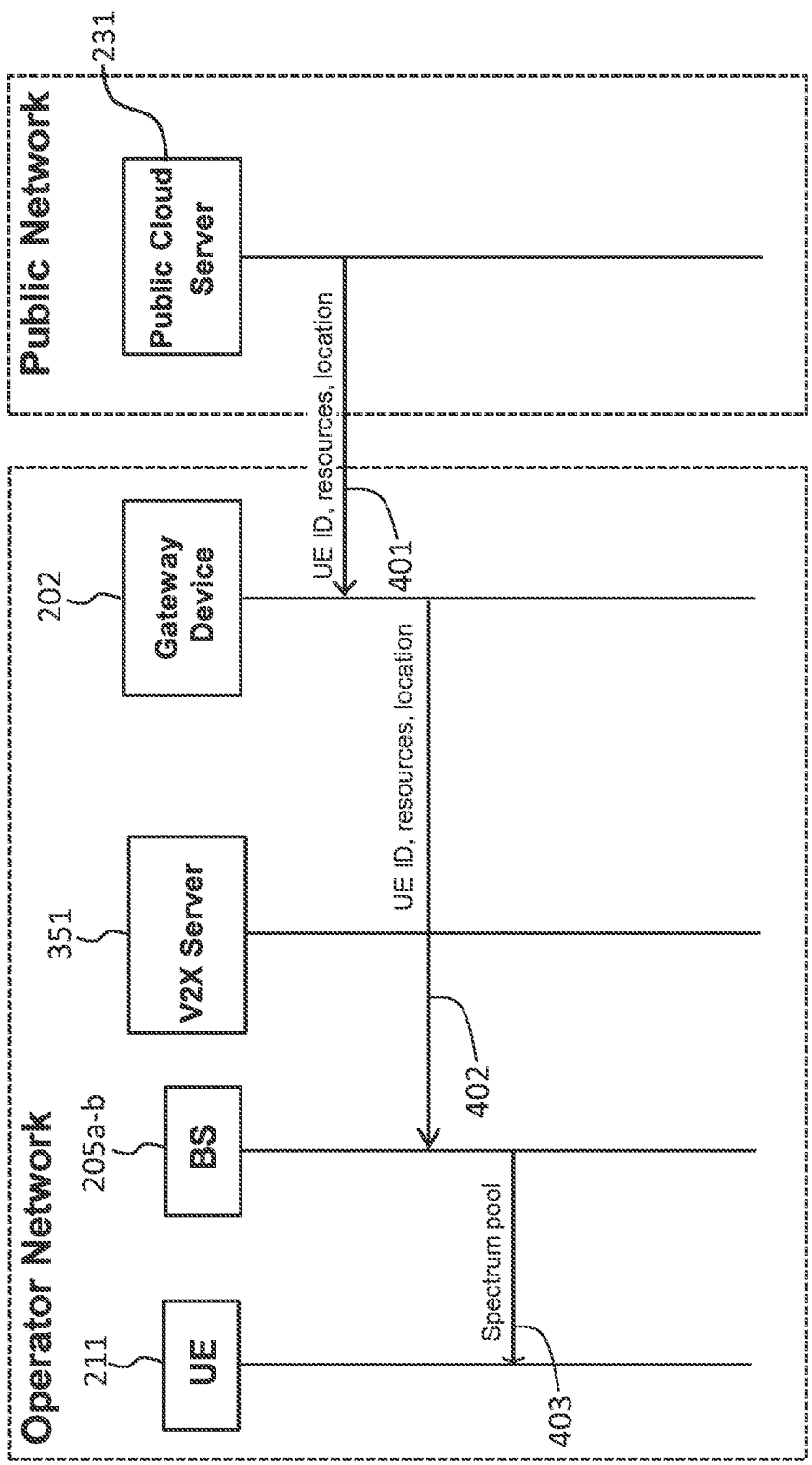
FIG. 4 shows a schematic diagram illustrating an exemplary procedure of message exchange for provision of resources according to an embodiment.

FIG. 4 shows a schematic diagram illustrating an exemplary procedure of message exchange for provision of resources to the terminal device or the user equipment 211 out of the network coverage, wherein the resources are mainly referred to spectrum resources but a similar procedure can be implemented for authentication/authorization functions, applications, etc.

In this embodiment, when the UE 211 is out of the network coverage, the public cloud server 231 can provide the resources to the user equipment (UE) 211 using spectrum pools via the gateway device 202. The gateway device 202 knowing the position of the user equipment (UE) 211 and its identification (ID) can forward this information to the selected base station 205a-b, wherein the UE 211 is in the network coverage of the selected base station 205a-b. The selected base station 205a-b can thus send the respective spectrum pools to the UE 211.

The procedure shown in FIG. 4 comprises the following steps. The public cloud server 231 can send the information of resources and locations for the UE 211 to the gateway device 202 (step 401). The gateway device 202 can forward this information to the selected base station 205a-b, wherein the UE 211 is in the network coverage of this selected base station 205a-b (step 402). The selected base station 205a-b can send the respective spectrum pool to the UE 211 (step 403).

For identifying the location of the user equipment (UE) 211, the gateway device 202 may identify the location of the UE 211 either by a maintained connection in which the UE location is already available, or by requesting it from a mobility server such as the mobility management entity in LTE networks.

For other possible implementations, the gateway device 202 can transfer the information regarding the spectrum resources to a V2X server 251, and the latter will provide the information regarding the spectrum resources to the UE 211 directly. This may be performed by using configuration files.

Figure 5:
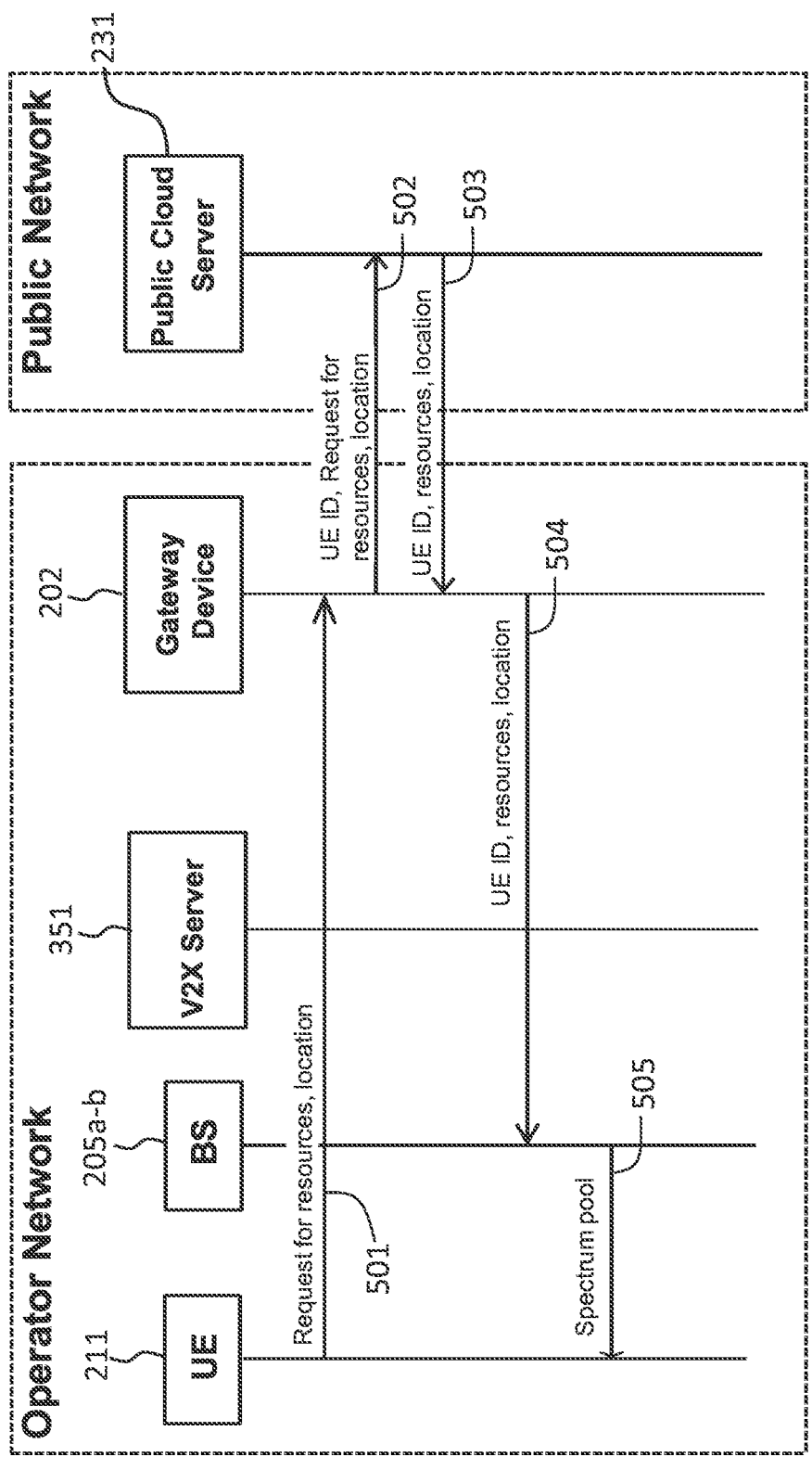
FIG. 5 shows a schematic diagram illustrating an exemplary procedure of message exchange for an update of a resource pool according to an embodiment.

FIG. 5 shows a schematic diagram illustrating an exemplary procedure of message exchange for an update of the resource pool to the terminal device 211 or the user equipment 211 out of the network coverage, wherein the resources are mainly referred to spectrum resources but a similar procedure can be implemented for authentication/authorization functions, applications, etc.

The procedure shown in FIG. 5 comprises the following steps in details. When the UE 211 enters or approaches an area in which the spectrum resources are invalid, the UE 211 can request valid spectrum resources via the gateway device 202 from the public cloud server 231 (step 501). The gateway device 202 can send the request from the UE 211 together with the identification (ID) of the UE 211 to the public cloud server 231 (step 502). The public cloud server 231 can send the information of resources and locations for the UE 211 to the gateway device 202 (step 503). The gateway device 202 can forward this information to a base station 205a-b, wherein the UE 211 is in the network coverage of this base station 205a-b (step 504). The base station 205a-b can send the respective spectrum pool to the UE 211 (step 505).

In the case when the user equipment (UE) 211 is in the network coverage of a base station 205a-b, the base station 205a-b can provide the UE 211 with specific spectrum resources according to its requirements. An exemplary implementation of the process for the provision of the spectrum resources will be shown in FIG. 6 further below.

The user equipment (UE) 211 can receive the indications from the base station 205a-b for the generic sidelink configuration, wherein the indications can be from the broadcast channel such as the system information blocks transmitted from the eNBs in LTE networks or can be dedicated messages such as the radio resource control messages transmitted from the eNBs in LTE networks or a combination of the two. Then, the UE 211 can report to the base station 205a-b its measurements regarding the data to be transmitted and the radio conditions (e.g., as they are captured by radio metrics such as a received signal strength indicator). This can then be transmitted to the gateway device 202 which can forward it to the public cloud server 231 for receiving a grant of the spectrum. The public cloud server 231 can provide the respective information to the gateway device 202. The gateway device 202 can provide this information to the base station 205a-b in the location under consideration and the base station 205a-b can include this information in the spectrum grant for the UE 211 with the considered ID. When the UE 211 is being handed over to a neighboring base station, then the previous process is repeated for the new base station so as to receive a new spectrum grant.

Figure 6:
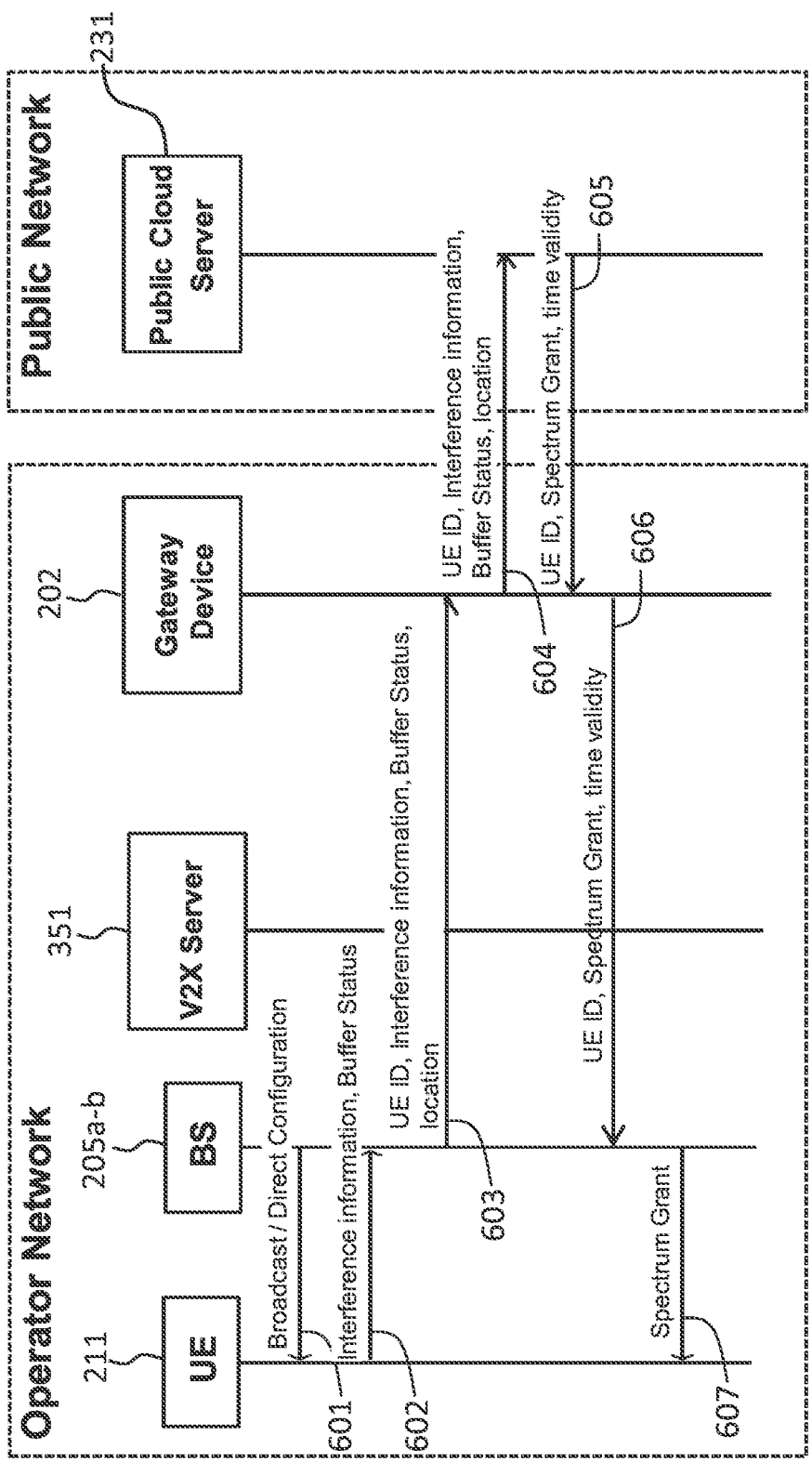
FIG. 6 shows a schematic diagram illustrating an exemplary procedure of message exchange for an update of a resource pool according to an embodiment.

FIG. 6 shows a schematic diagram illustrating an exemplary procedure of message exchange for an update of the resource pool to the terminal device or the user equipment (UE) 211 in the network coverage, wherein the resources are mainly referred to spectrum resources but a similar procedure can be implemented for authentication/authorization functions, applications, etc. The procedure shown in FIG. 6 comprises the following steps in details.

The user equipment (UE) 211 receives the indications from the base station 205a-b for the generic sidelink configuration via a broadcast or a direct configuration (step 601). The user equipment (UE) 211 can report to the base station 205a-b its measurements regarding the data to be transmitted and the radio conditions such as interference information and buffer status (step 602).

The gateway device 202 can forward the report to the public cloud server 231 for receiving a grant of the spectrum (step 604). The public cloud server 231 can provide the respective information regarding the grant of spectrum, time validity and location to the gateway device 202 (step 605). The gateway device 202 can provide the information to the base station 205a-b (step 606). The base station 205a-b can send the information including the spectrum grant to the user equipment (UE) 211 with the considered ID (step 607). The base station 205a-b transmits the report of the user equipment (UE) 211 to the gateway device 202 (step 603).

In another alternative implementation, the user equipment (UE) 211 may directly contact the gateway device 202 (via application layer messages) without the intervention or/and translation of the base station 205a-b.

It is worth noting that the embodiments of the invention do not restrict the gateway device 202 to connect to a public cloud server 231 in the internet. The gateway device 202 can connect to any type of network that is not located in the local operator network 201. In this regard, a communication system with a topology similar to the one presented in FIG. 2 may be implemented, which is illustrated in FIG. 7 further below.

Figure 7:
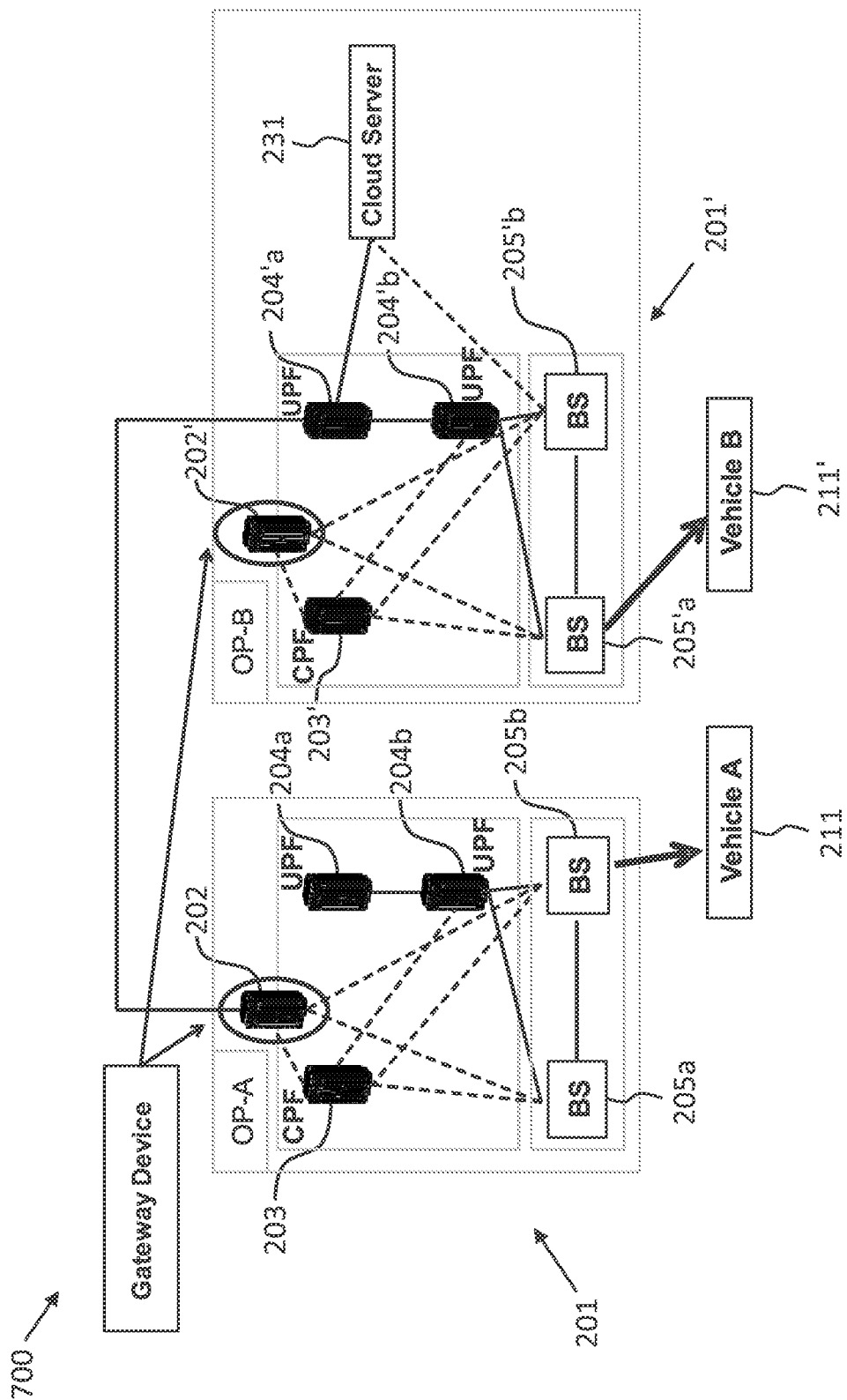
FIG. 7 shows a schematic diagram of a communication system comprising a mobile communication network and a further mobile communication network according to an embodiment.

FIG. 7 shows a schematic diagram of a communication system 700 comprising a mobile communication network 201 and a further mobile communication network 201' according to an embodiment, wherein the mobile communication network 201 comprises a gateway device 202 and the further mobile communication network 201' comprises a further gateway device 202' and wherein the mobile communication network 201 and the further mobile communication network 201' are operated by different network operators, OP-A and OP-B.

As shown in FIG. 7, an external server 231 is located in the further mobile communication network 201' operated by the operator OP-B and the external server 231 can register with the gateway device 202 of the mobile communication network 201 operated by the operator OP-A via the packet network (the user plane).

Figure 8:
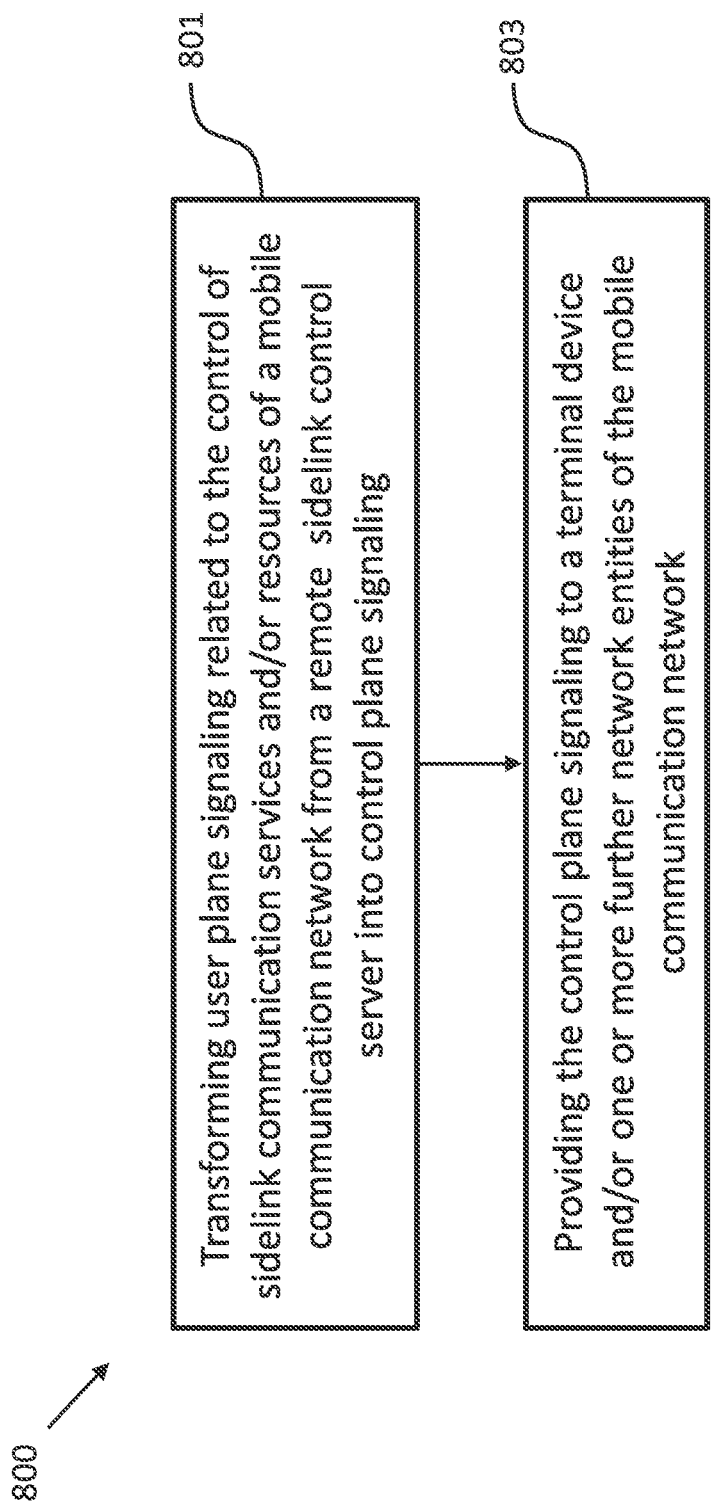
FIG. 8 shows a schematic diagram illustrating a method of operating a gateway device according to an embodiment.

FIG. 8 shows a schematic diagram illustrating a method of operating a gateway device 202, wherein the method 800 comprises the following steps. Transforming 801 user plane signaling related to the control of sidelink communication services and/or resources of a mobile communication network from a remote sidelink control server 231 into control plane signaling, and providing 803 the control plane signaling to a terminal device 211 and/or one or more further network entities 205a-b, 301 of the mobile communication network 201.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A gateway device configured to:
   transform, into control plane signaling, user plane signaling that is from a remote sidelink control server and that is related to control of at least one of sidelink communication services or resources of a mobile communication network: and
   provide the control plane signaling to at least one of a terminal device or one or more further network entities of the mobile communication network.

2. The gateway device of claim 1, wherein the gateway device is further configured to:
   transform, into user plane signaling, control plane signaling that is from the at least one of the terminal device or the one or more further network entities and that is related to the control of the at least one of the sidelink communication services or resources of the mobile communication network: and
   provide the user plane signaling to a remote sidelink communication server.

3. The gateway device of claim 2, wherein the user plane signaling is based on internet protocol (IP) packets.

4. The gateway device of claim 3, wherein the one or more further network entities of the mobile communication network comprise a local sidelink communication server of the mobile communication network: and
   wherein the gateway device is further configured to:
   transform, into control plane signaling, user plane signaling that is from the remote sidelink control server and that is related to a registration request of the remote sidelink control server: and provide the control plane signaling to a local sidelink control server for registering the remote sidelink control server with the local sidelink control server.

5. The gateway device of claim 3, wherein the one or more further network entities of the mobile communication network comprise a local sidelink control server of the mobile communication network: and
   wherein the gateway device is further configured to:
   transform, into user plane signaling, control plane signaling that is from the local sidelink control server and that is related to a registration request of the terminal device: and
   provide the user plane signaling to the remote sidelink control server for registering the terminal device with the remote sidelink control server.

6. The gateway device of claim 5, wherein the gateway device is further configured to:
   transform, into user plane signaling, control plane signaling related to a request, by the terminal device of the mobile communication network, for sidelink radio resources: and provide the user plane signaling to the remote sidelink control server.

7. The gateway device of claim 6, wherein the one or more further network entities of the mobile communication network comprises two or more base stations: and
wherein the gateway device is configured to select, according to a location of the terminal device, one of the two or more base stations for providing the control plane signaling to the selected base station.

8. The gateway device of claim 7, wherein the one or more further network entities of the mobile communication network comprise a base station: and
wherein the gateway device is further configured to:
transform, into user plane signaling, control plane signaling that is related to sidelink channel information and that is provided by the base station: and
provide the user plane signaling to the remote sidelink control server:
transform, into control plane signaling, according to the sidelink channel information, user plane signaling that is from the remote sidelink control server and that is related to allocation of sidelink radio resources: and
provide the control plane signaling to the base station.

9. The gateway device of claim 6, wherein the gateway device is further configured to:
transform, into user plane signaling, control plane signaling that is related to sidelink channel information and that is provided by the terminal device:
provide the user plane signaling to the remote sidelink control server:
transform, into control plane signaling, according to the sidelink channel information, user plane signaling that is from the remote sidelink control server and that is related to allocation of sidelink radio resources: and
provide the control plane signaling to the terminal device.

10. A method of operating a gateway device comprising:
transforming, into control plane signaling, user plane signaling that is from a remote sidelink control server and that is related to at least one of control of sidelink communication services or resources of a mobile communication network; and
providing the control plane signaling to at least one of a terminal device or one or more further network entities of the mobile communication network.

11. A computer program product comprising non-transitory computer readable medium that, when executed on a computer, cause the computer to perform the method of claim 10.

12. A communication system comprising:
one or more mobile communication networks, wherein each mobile communication network comprises a gateway device according to claim 1; and
a remote sidelink control server configured to communicate with the one or more gateway devices according to user plane signaling.

13. The communication system according to claim 12, wherein each gateway device is located at an edge of the respective mobile communication network.

14. The communication system according to claim 13, wherein the remote sidelink control server is a public cloud server.

15. The communication system according to claim 13, wherein the remote sidelink control server is a local sidelink control server of one of the one or more mobile communication networks.

16. A gateway device, comprising:
one or more processors;
a non-transitory computer readable medium having a program stored thereon for execution by the one or more processors, the program including instructions to
transform, into control plane signaling, user plane signaling that is from a remote sidelink control server and that is related to control of at least one of sidelink communication services or resources of a mobile communication network; and
provide the control plane signaling to at least one of a terminal device or one or more further network entities of the mobile communication network.

17. The gateway device of claim 16, wherein the program further includes instructions to:
transform, into user plane signaling, control plane signaling that is from the at least one of the terminal device or the one or more further network entities and that is related to the control of the at least one of the sidelink communication services or resources of the mobile communication network; and
provide the user plane signaling to a remote sidelink communication server.

18. The gateway device of claim 17, wherein the one or more further network entities of the mobile communication network comprise a local sidelink communication server of the mobile communication network; and
wherein the program further includes instructions to:
transform, into control plane signaling, user plane signaling that is from the remote sidelink control server and that is related to a registration request of the remote sidelink control server; and
provide the control plane signaling to a local sidelink control server for registering the remote sidelink control server with the local sidelink control server.

19. The gateway device of claim 18, wherein the one or more further network entities of the mobile communication network comprise a local sidelink control server of the mobile communication network; and
wherein the program further includes instructions to:
transform, into user plane signaling, control plane signaling that is from the local sidelink control server and that is related to a registration request of the terminal device; and
provide the user plane signaling to the remote sidelink control server for registering the terminal device with the remote sidelink control server.

20. The gateway device of claim 19, wherein the program further includes instructions to:
transform, into user plane signaling, control plane signaling related to a request, by the terminal device of the mobile communication network, for sidelink radio resources; and
provide the user plane signaling to the remote sidelink control server.

* * * * *